(12) United States Patent
Upendram et al.

(10) Patent No.: US 11,091,076 B1
(45) Date of Patent: Aug. 17, 2021

(54) SEAT BACK HEATER MAT ATTACHMENT

(71) Applicant: Faurecia Automotive Seating, LLC, Auburn Hills, MI (US)

(72) Inventors: Harshavardhan Upendram, Northville, MI (US); Diane Jones, Huntington Woods, MI (US); James Wehrle, Troy, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/778,811

(22) Filed: Jan. 31, 2020

(51) Int. Cl.
*B60N 2/58* (2006.01)
*B60N 2/56* (2006.01)

(52) U.S. Cl.
CPC ......... *B60N 2/5685* (2013.01); *B60N 2/5875* (2013.01)

(58) Field of Classification Search
CPC .. B60N 2/5685; B60N 2/5635; B60N 2/5678; B60N 2/5875
USPC ...................................................... 297/180.1
See application file for complete search history.

(56) References Cited

U.S. PATENT DOCUMENTS

| 4,558,905 A | 12/1985 | Natori | |
|---|---|---|---|
| 4,695,091 A | 9/1987 | Altmann | |
| 4,718,718 A | 1/1988 | Maruyama | |
| 4,927,209 A * | 5/1990 | Maruyama | A47C 7/748 297/180.12 |
| 5,902,014 A * | 5/1999 | Dinkel | B60N 2/5635 297/180.1 |
| 7,223,948 B2 * | 5/2007 | Howick | B60N 2/5685 219/211 |
| 7,370,911 B2 * | 5/2008 | Bajic | B60N 2/5635 297/180.11 |
| 7,588,288 B2 * | 9/2009 | Bajic | B60N 2/5635 297/180.14 |
| 8,507,831 B2 * | 8/2013 | Howick | B60N 2/5685 219/210 |
| 8,544,942 B2 * | 10/2013 | Lazanja | H05B 1/028 297/180.12 |
| 8,814,262 B2 * | 8/2014 | Abe | A47C 7/74 297/180.12 |
| 9,302,602 B2 * | 4/2016 | Yoshida | B60N 2/5816 |
| 10,065,543 B2 * | 9/2018 | Persson | B60N 2/5657 |
| 10,682,935 B2 * | 6/2020 | Lewis | B60N 2/5875 |
| 10,703,238 B2 * | 7/2020 | Suzuki | B60N 2/5883 |
| 2003/0111454 A1 * | 6/2003 | Ishiyama | B60N 2/5635 219/217 |
| 2004/0036326 A1 * | 2/2004 | Bajic | B60N 2/5685 297/180.14 |
| 2004/0069762 A1 * | 4/2004 | Yoneyama | B60N 2/7017 219/217 |

(Continued)

FOREIGN PATENT DOCUMENTS

DE 102006017778 10/2007

*Primary Examiner* — Shin H Kim
(74) *Attorney, Agent, or Firm* — Barnes & Thornburg LLP

(57) ABSTRACT

An occupant-support base includes a seat assembly and a heater mat coupled to the seat assembly. The seat assembly includes a seat frame, a foam pad coupled to the seat frame, and a trim cover coupled to the foam pad. The trim cover is coupled to the seat assembly by one or more attachments. The heater mat is arranged between the trim cover and the foam pad and includes a carrier sheet and a heating element coupled to the carrier sheet. The heater mat is secured to the seat assembly with a fastener system.

16 Claims, 5 Drawing Sheets

(56) References Cited

U.S. PATENT DOCUMENTS

| | | | |
|---|---|---|---|
| 2004/0094534 A1* | 5/2004 | Howick | H05B 3/56 |
| | | | 219/529 |
| 2004/0100131 A1* | 5/2004 | Howick | B60N 2/002 |
| | | | 297/180.12 |
| 2005/0140189 A1* | 6/2005 | Bajic | B60N 2/5635 |
| | | | 297/180.1 |
| 2005/0199611 A1* | 9/2005 | Howick | H05B 3/34 |
| | | | 219/548 |
| 2005/0242081 A1* | 11/2005 | Howick | B60N 2/5685 |
| | | | 219/529 |
| 2007/0158981 A1* | 7/2007 | Almasi | B60N 2/5614 |
| | | | 297/180.12 |
| 2007/0188007 A1* | 8/2007 | Lazanja | B60N 2/5621 |
| | | | 297/452.42 |
| 2008/0191521 A1* | 8/2008 | Bajic | B60N 2/5635 |
| | | | 297/180.12 |
| 2009/0152909 A1* | 6/2009 | Andersson | B60N 2/565 |
| | | | 297/180.13 |
| 2010/0219664 A1* | 9/2010 | Howick | B60R 1/12 |
| | | | 297/180.12 |
| 2011/0240751 A1* | 10/2011 | Rauh | B64D 13/00 |
| | | | 236/91 D |
| 2012/0228903 A1* | 9/2012 | Abe | B60N 2/5825 |
| | | | 297/180.12 |
| 2015/0003493 A1* | 1/2015 | Bieck | B60N 2/5685 |
| | | | 374/51 |
| 2015/0239321 A1* | 8/2015 | Muller | G01N 19/10 |
| | | | 297/180.1 |
| 2016/0029438 A1* | 1/2016 | Sakatani | H05B 3/36 |
| | | | 219/217 |
| 2016/0052432 A1* | 2/2016 | Lafferty | B60N 2/5685 |
| | | | 297/180.12 |
| 2017/0066355 A1* | 3/2017 | Kozlowski | B60N 2/56 |
| 2018/0325264 A1* | 11/2018 | Gallagher | A47C 7/74 |
| 2019/0135147 A1* | 5/2019 | Lewis | B60N 2/5875 |
| 2019/0184869 A1* | 6/2019 | Galbreath | B60N 2/5678 |
| 2019/0241101 A1* | 8/2019 | Line | B60N 2/5685 |
| 2019/0344689 A1* | 11/2019 | Bailey | B60R 16/027 |
| 2019/0371995 A1* | 12/2019 | Tait | B60N 2/5685 |
| 2019/0381917 A1* | 12/2019 | Kamata | B60N 2/5883 |
| 2020/0180479 A1* | 6/2020 | Russman | B60N 2/5657 |
| 2020/0247287 A1* | 8/2020 | Lacovone | B60N 2/5657 |

* cited by examiner

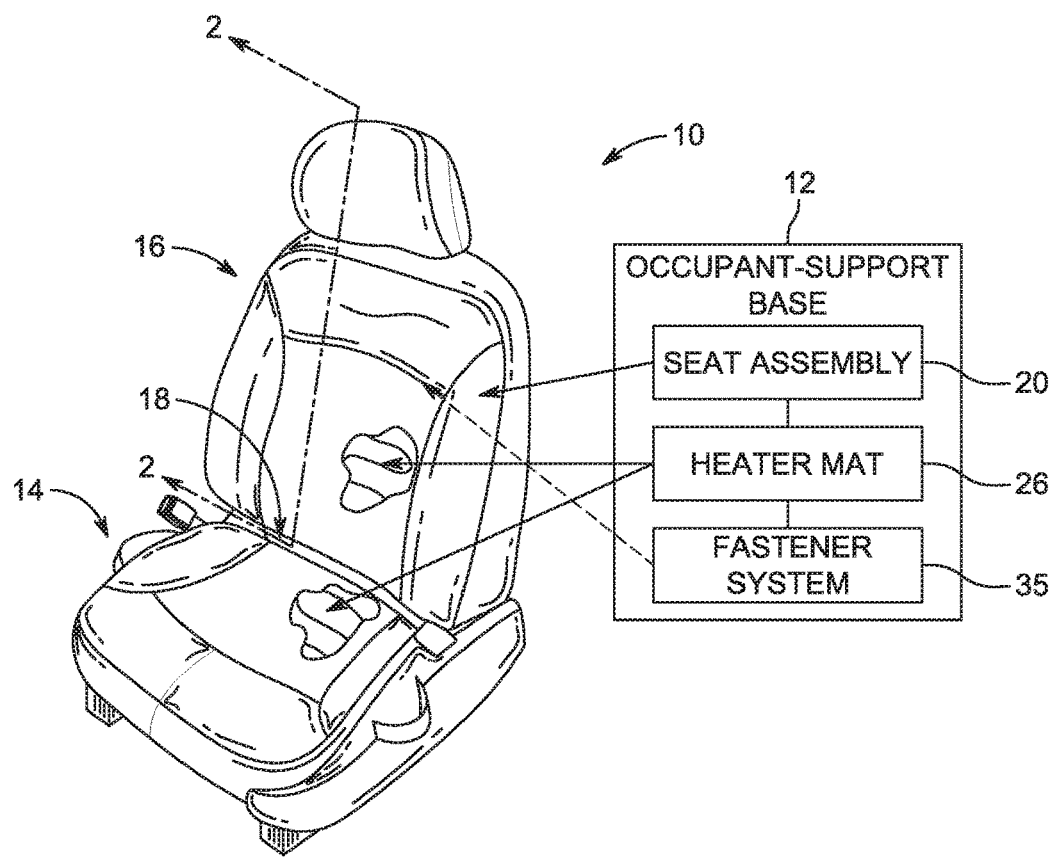
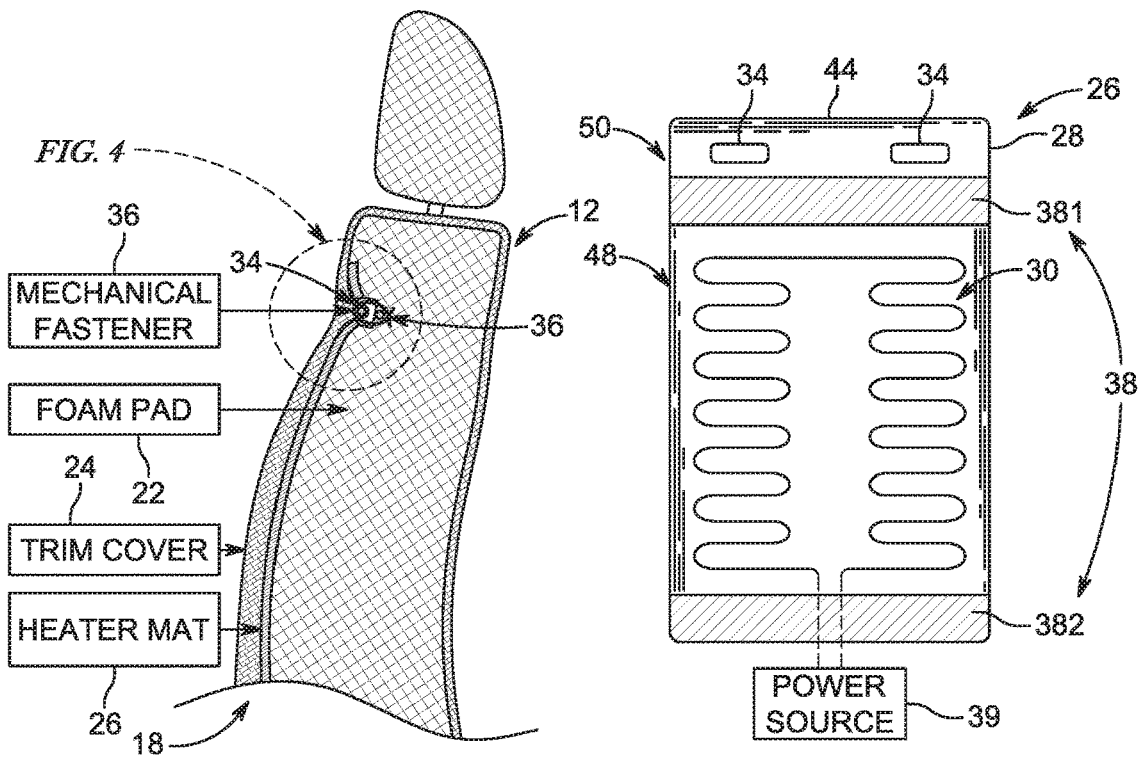
*FIG. 1*
*FIG. 2*  *FIG. 3*

SEAT BACK HEATER MAT ATTACHMENT

BACKGROUND

The present disclosure relates to occupant supports, and particularly to occupant supports for use in a vehicle. More particularly, the present disclosure relates to an occupant-support base with a heater mat.

SUMMARY

According to the present disclosure, an occupant support comprising a seat bottom and a seat back which are configured to support an occupant thereon within a vehicle. Both the seat bottom and the seat back may be referred to as an occupant-support base. The occupant-support base includes a seat assembly and a heater mat coupled to the seat assembly. The seat assembly has a foam pad and an outer trim cover that wraps around the cushion. The heater mat is arranged between the foam pad and the trim cover and is configured to provide thermal effects for an occupant seated on the seat assembly.

In illustrative embodiments, the foam pad includes a pad attachment that extends through an attachment trench formed in the foam pad. The pad attachment is embedded in the attachment trench and extends longitudinally through the attachment trench. The pad attachment is configured to couple to portions of the outer trim cover to mount the trim cover to the foam pad and assemble the occupant-support base.

In illustrative embodiments, the trim cover includes outer sheet, an attachment flap coupled to an inner surface of the outer sheet, and a trim attachment. The pad attachment and the trim attachment are illustratively embodied as, but not limited to listing attachments that extend through the foam pad and the trim cover, respectively. During assembly of the occupant-support base, the trim cover is pulled around the foam pad and the attachments are tied together by one or more mechanical fasteners to retain the trim cover to the foam pad.

In illustrative embodiments, the heater mat includes a carrier sheet and a heating element coupled to the carrier sheet. The carrier sheet lies flat along an outer surface of the foam pad and extends away from a seat bite line region of the occupant-support region along the foam pad. The heater mat is coupled to either the foam pad or the trim cover by one or more adhesive strips which are applied before the trim cover is worked around and attached to the foam pad. The mechanical fastener and the adhesive strips cooperate with one another to provide a fastener system that both attaches the trim cover to the foam pad and couples the heater mat to the seat assembly during assembly of the trim cover with the foam pad. The mechanical fastener retains the heater mat in a flat arrangement along the outer surface of the foam pad if the adhesive strip fails to prevent the heater mat from moving toward the seat bite line region between the trim cover and the foam pad.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective and diagrammatic view of an occupant-support base that includes a seat assembly configured to support an occupant thereon, and with portions of the seat assembly cut away to show a heater mat coupled to the seat assembly and configured to provide thermal effects for the occupant, and a fastener system configured to mount and retain the heater mat to the seat assembly such that the heater mat lies flat along the seat assembly to block the heater mat from sliding down the seat assembly toward a seat bite area of the occupant-support base;

FIG. 2 is a cross sectional view taken along line 2-2 shown in FIG. 1 showing that the occupant-support base includes a foam pad and an outer trim cover and showing the heater pad arranged between the cushion and the outer trim cover and retained to the seat assembly by a mechanical fastener;

FIG. 3 is an elevation view of the heater mat from FIGS. 1-4 showing that the heater mat includes a carrier sheet and a heating element coupled to the carrier sheet and further showing that a portion of the carrier sheet is devoid of the heating element and the aperture is formed in the portion of the carrier sheet that is devoid of the heating element;

FIG. 6 is an elevation view of the cushion without the trim cover and the heater mat de-coupled from the foam pad as suggesting that the heater mat may be coupled to an outer surface of the foam pad by one or more adhesive strips;

FIG. 7 is an elevation view of the cushion with the heater mat coupled to the outer surface of the foam pad by the adhesive strips and a plurality of apertures formed in the heater mat aligned with a listing attachment that extends through the foam pad;

FIG. 8 is an elevation view showing the trim cover being assembled with the foam pad using mechanical fasteners that tie the attachment in the foam pad with the attachment coupled to the trim cover; and FIG. 9 is an enlarged view of a portion of FIG. 8 showing that the mechanical fastener extends through the aperture formed in the heater mat as the trim cover is coupled to the cushion by the mechanical fastener to reinforce attachment of the heater mat to the seat assembly so that the heater pad is blocked from sliding toward the seat bite line region of the occupant support base if one or more of the adhesive strips fail during use.

DETAILED DESCRIPTION

Figure 4:
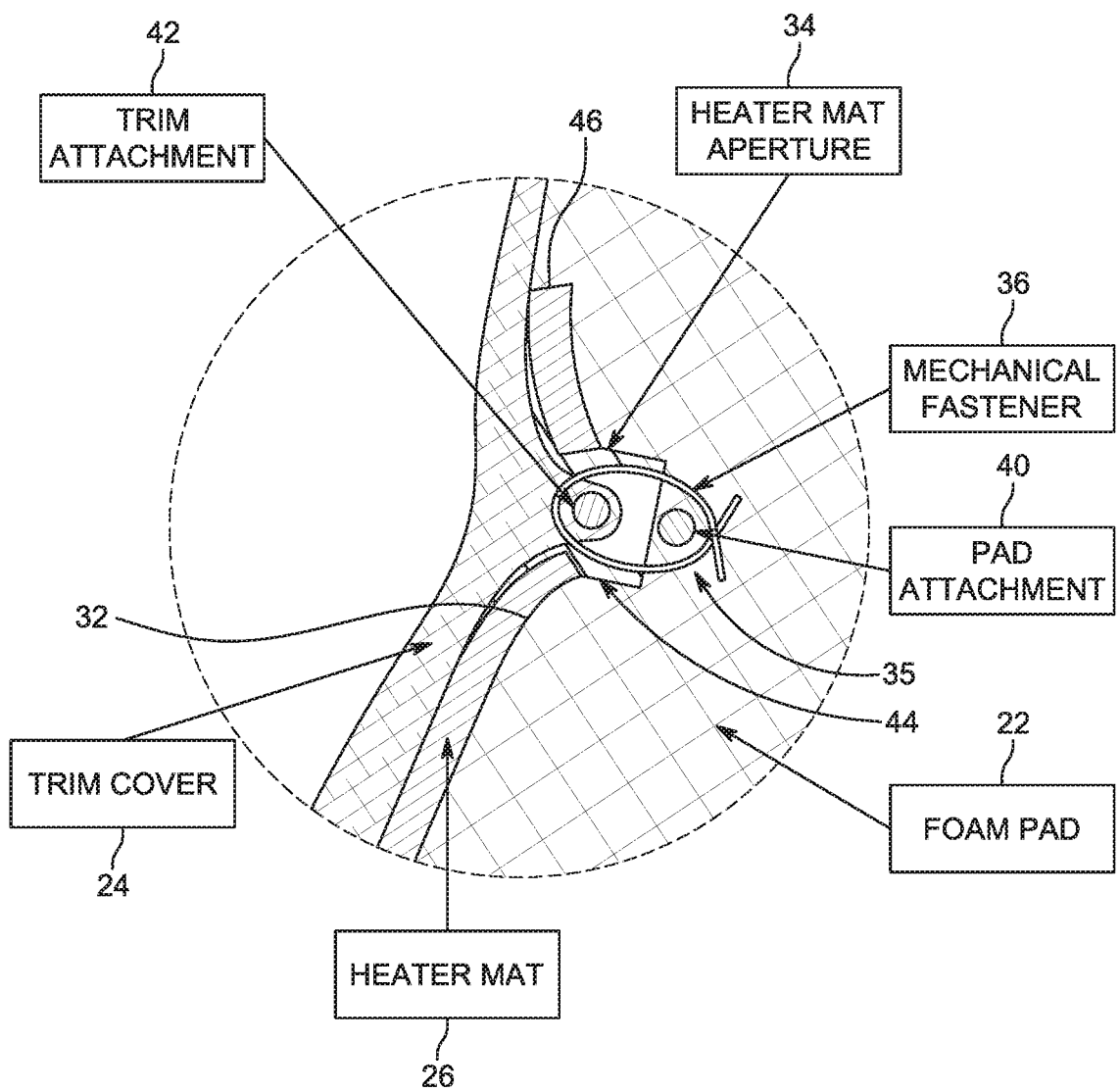
FIG. 4 is an enlarged view of a portion of FIG. 2 showing that both the foam pad and the outer trim cover include an attachment which are coupled together by a mechanical fastener that passes through an aperture formed in the heater mat to couple the outer trim to the foam pad and to couple the heater mat to the seat assembly all in one step.

An occupant support 10 in accordance with the present disclosure is shown in FIG. 1 and comprises a plurality of occupant-support bases 12. The occupant support bases 12 may be embodied as a seat bottom 14 (also called a seat cushion assembly) and a seat back 16 (also called a seat back assembly) which are configured to support an occupant thereon within a vehicle in the illustrative embodiment. The seat bottom 14 and the seat back 16 are coupled to one another and establish a seat bite line region 18 where the seat bottom 14 and the seat back 16 meet.

Each occupant-support base 12 includes a seat assembly 20 that has a foam pad 22 and an outer trim cover 24 that wraps around the foam pad 22 as shown in FIGS. 1 and 2. The foam pad 22 comprises a foam material 54 to provide cushioning for the occupant seated on the occupant-support base 12. The outer trim cover 24 wraps around the foam pad 22 to provide greater aesthetics and to increase durability of the occupant-support base 12.

To couple the trim cover 24 to the foam pad 22 during assembly of the occupant-support base 12, a pad attachment 40 is provided on the foam pad 22 and a trim attachment 42 is provided on the trim cover 24 as shown in FIGS. 2 and 3. The pad attachment 40 and the trim attachment 42 are illustratively embodied as listing attachments that extend through the foam pad 22 and the trim cover 24, respectively. As the trim cover 24 is pulled around the foam pad 22 during assembly, the attachments 40, 42 are tied together by one or more mechanical fasteners 36 to retain the trim cover 24 to the foam pad 22.

Each occupant-support base 12 may further include a heater mat 26 arranged between the foam pad 22 and the trim cover 24 as shown in FIGS. 2 and 3. The heater mat 26 includes a carrier sheet 28 and a heating element 30 coupled to the carrier sheet 28. The carrier sheet 28 lies flat along an outer surface 32 of the cushion and extends away from the seat bite line region 18 along the foam pad 22. The heating element 30 is illustratively embodied as a conductive wire that, when energized by a power source 39, produces heat. The heat produced by the heating element 30 is conducted through the trim cover 24 to an occupant seated on the occupant-support base 12.

The heater mat 26 is coupled to either the foam pad 22 or the trim cover 24 by one or more adhesive strips 38 which are applied before the trim cover 24 is worked around and attached to the foam pad 22. In the illustrative embodiment, a first adhesive strip 381 is arranged near an outer end of the heater mat 26 and a second adhesive strip 382 is spaced apart from the first adhesive strip 381 near a lower end of the heater mat 26. The mechanical fastener 36 and the adhesive strips 38 cooperate with one another to provide a fastener system 35 that both attaches the trim cover 24 to the foam pad 22 and couples the heater mat 26 and the seat assembly 20 during assembly of the trim cover 24 with the foam pad 22.

Figure 6:
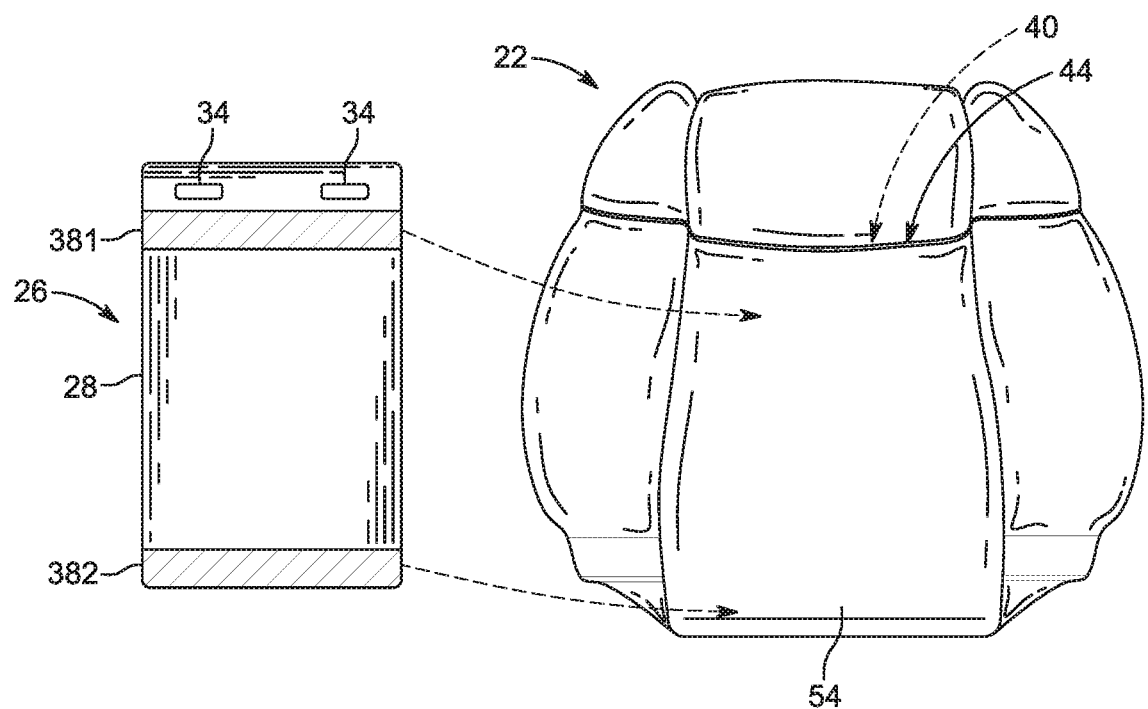
FIGS. 6-9 are a series of elevation views of the occupant-support base being assembled with the heater mat.

The carrier sheet 28 of the heater mat 26 is formed to include one or more apertures 34 as shown in FIGS. 3 and 4. The apertures 34 provide windows for a technician to see through as the heater mat 26 is coupled to the foam pad 22. The arrangement of the apertures 34 in the heater mat 26 relative to the attachments 40, 42 facilitates assembly of the occupant-support base 12 and reduces amount of assembly time for the occupant-support base 12 as suggested in FIGS. 6-9. The apertures 34 may be aligned with the pad attachment 40 by looking through the apertures 34 as the heater mat 26 is brought into contact with the foam pad 22 and bonded to the foam pad 22 with the adhesive strips 38 as suggested in FIG. 6. The trim cover 24 may then be pulled over the foam pad 22 and positioned so that the trim attachment 42 is also aligned with the apertures 34 and the pad attachment 40. With the attachments 40, 42 aligned with the apertures 34, the mechanical fastener 36 may be gripped around each attachment 40, 42 while passing through an aperture 34 to couple the trim cover 24 to the foam pad 22 and to reinforce the connection between the heater mat 26 and the seat assembly 20 all in one step.

Figure 7:
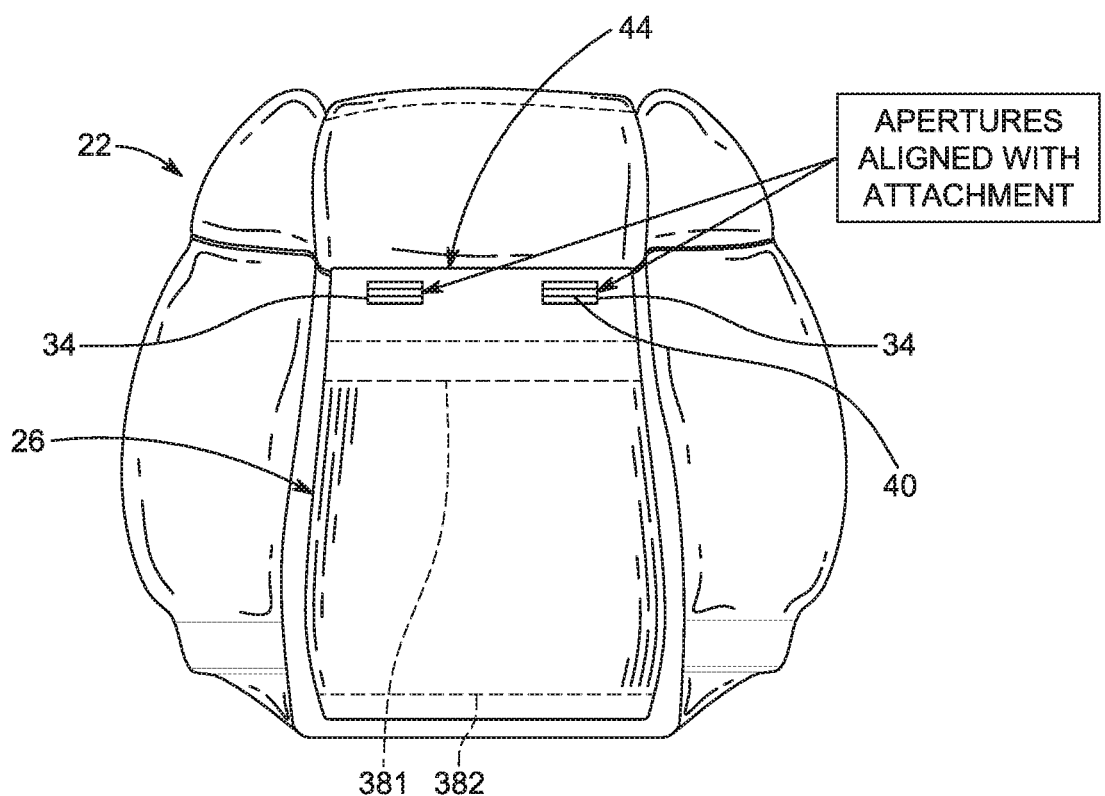

The mechanical fastener 36 provides an additional connection point between the heater mat 26 and the seat assembly 20 to maintain the heater mat 26 in face-to-face contact with the foam pad 22 as shown in FIGS. 2 and 7. Over time and after continued use of the occupant-support base 12, moisture and/or repetitive forces on the heater mat 26 may cause the adhesive strips 38 to fail. If the adhesive strips fail, the heater mat 26 may slide toward the seat bite line region 18 and bunch-up in the seat bite line region 18. The mechanical fastener 36 is configured to retain an outermost end 46 of the heater mat 26 away from the seat bite line region 18 to block the heater mat 26 from sliding toward the seat bite line region 18 and bunching up in the seat bite line region 18.

In the illustrative embodiment, the mechanical fastener 36 is a hog ring. In other embodiments, another type of mechanical fastener such as a staple, a wire, a zip-tie, a pin, a screw, or any other suitable faster may be used. In some embodiments, the adhesive strips 38 may be omitted and the heater mat 26 may be retained to the seat assembly 20 by only the mechanical fastener 36.

Figure 5:
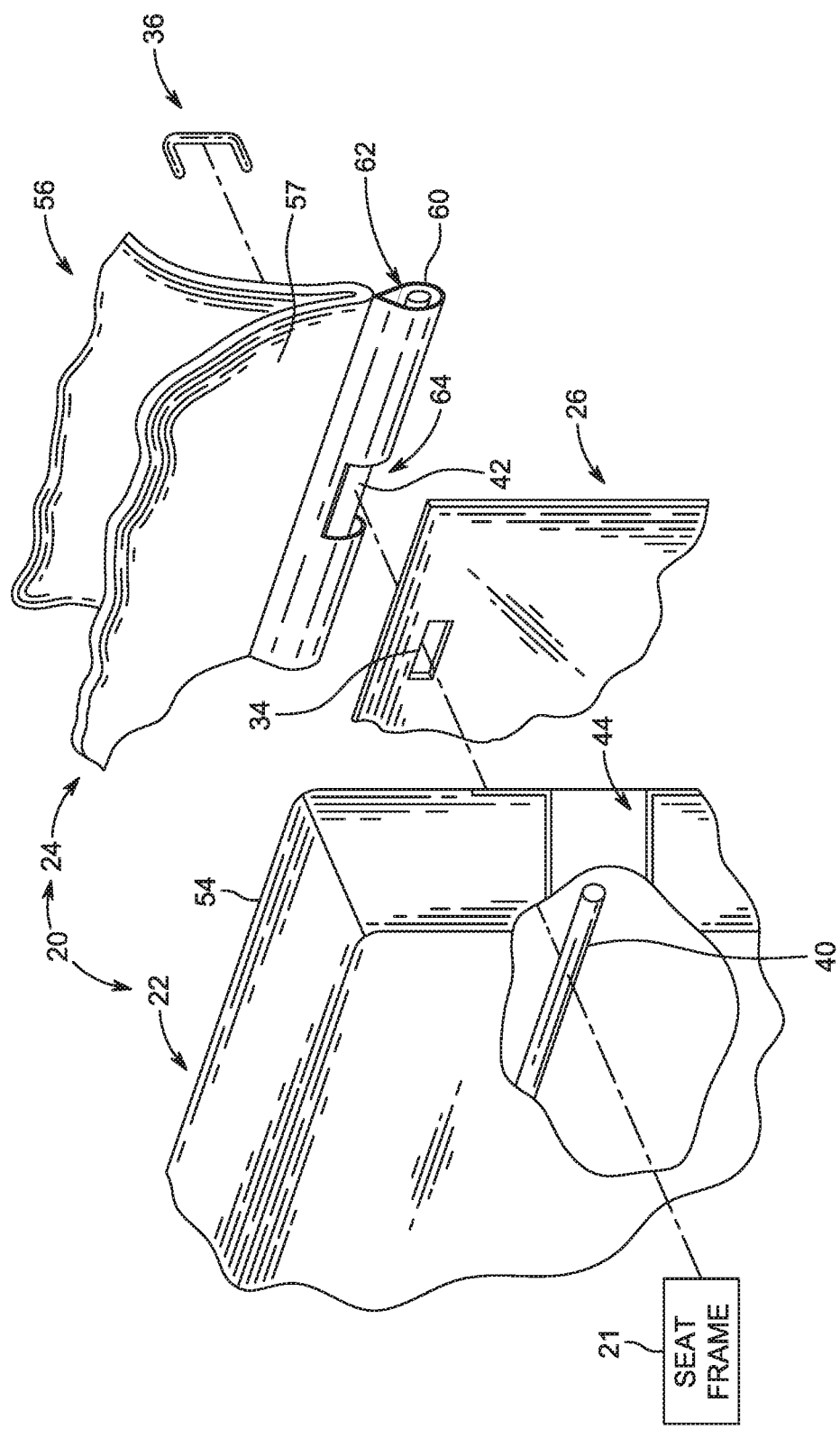
FIG. 5 is an exploded assembly view of a portion of the occupant-support base from FIGS. 1-3 showing the attachments in both the foam pad and the trim cover aligned with the aperture formed in the heater mat and suggesting that the mechanical fastener is configured to grip both listing attachments with the heater mat positioned therebetween to retain the heater mat to the seat assembly.

In some embodiments, the seat assembly 20 includes a seat frame 21, foam pad 22 coupled to the seat frame 21, and a trim cover 24 coupled to the foam pad 22 as shown in FIG. 5. The seat frame 21 may be made from a metallic material to provide support for the occupant-support base 12 as a whole. The pad attachment 40 may be anchored to the seat frame 21 to provide additional support for the heater mat 26 and the trim cover 24. The pad attachment 40 extends through an attachment trench 44 which is formed in foam pad 22. The attachment trench 44 may be a formed gap in the foam pad 22 as shown in FIG. 4 or may be a slit in the foam pad 22 that closes dues to the foam material 54 of the foam pad 22.

The trim cover 24 includes including an outer sheet 56, an attachment flap 60 coupled to an inner surface 57 of the outer sheet 56, and trim attachment 42 as shown in FIG. 5. The outer sheet 56 covers the foam pad 22 and the heater mat 26 when the occupant-support base 12 is fully assembled. The attachment flap 60 is formed into a loop to define an attachment conduit 62 that receives the trim attachment 42 therein. The attachment flap 60 is formed to include one or more cutouts 64 that expose the trim attachment 42 for coupling with the pad attachment 40 by the mechanical fastener 36 as suggested in FIG. 5. The attachment flap 60 and the trim attachment 42 are inserted into the attachment trench 44 when the trim cover 24 is being installed on the foam pad 22 by tying the attachments 40, 42 together with mechanical fastener 36.

The carrier sheet 28 of the heater mat 26 is made from a felt material that supports the heating element 30 on or in the carrier sheet 28. The heating element 30 extends across only a portion of an area of the carrier sheet 28 to provide a heating area 48 and an extension area of the carrier sheet 28 as shown in FIG. 3. The conductive coils of the heating element 30 are arranged in the heating area 48 of the carrier sheet 28. The extension area 50 is devoid of the heating element 30 and is formed to include apertures 34 to be used in fastening the heater mat 26 to the seat assembly 20. The extension area 50 is devoid of the heating element 30 so that the mechanical fastener 36 does not disrupt or interfere with the heating element 30 once the mechanical fastener 36 is installed to secure the heater mat 26 to the seat assembly 20.

Figure 8:
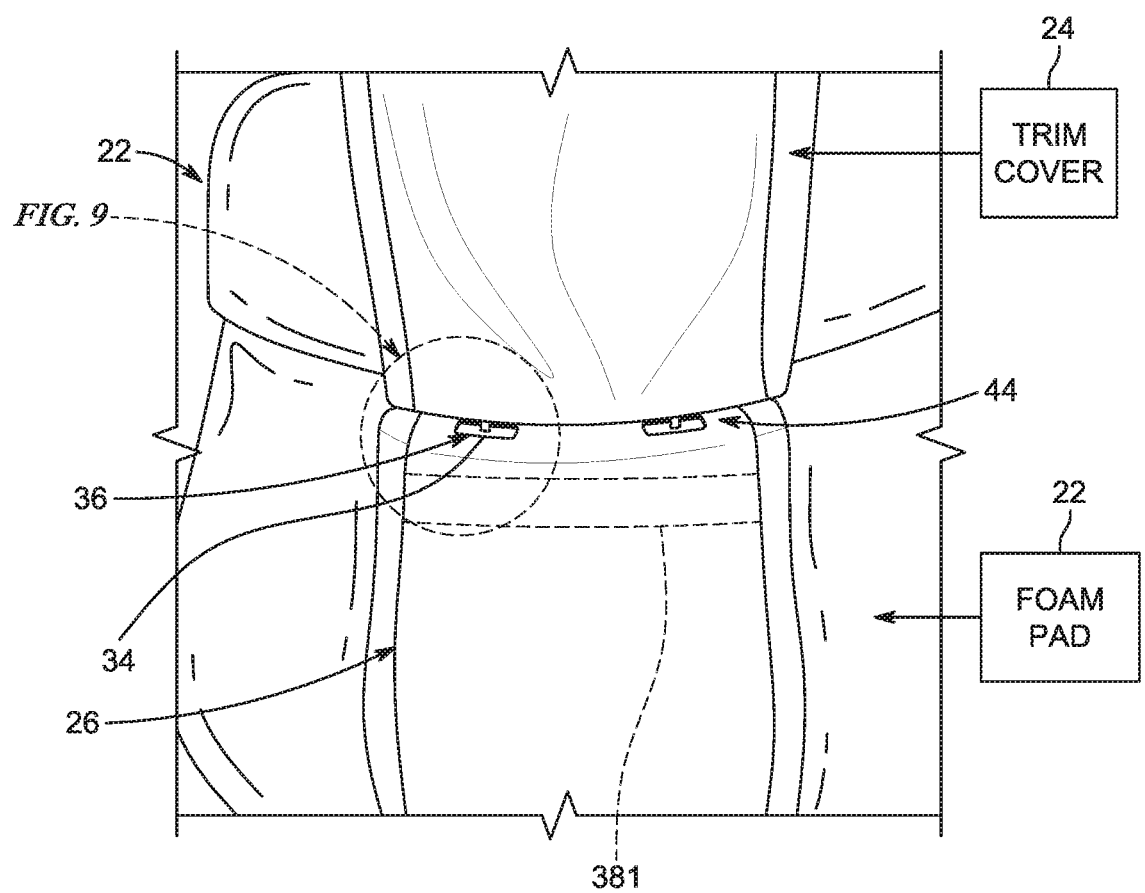
Figure 9:
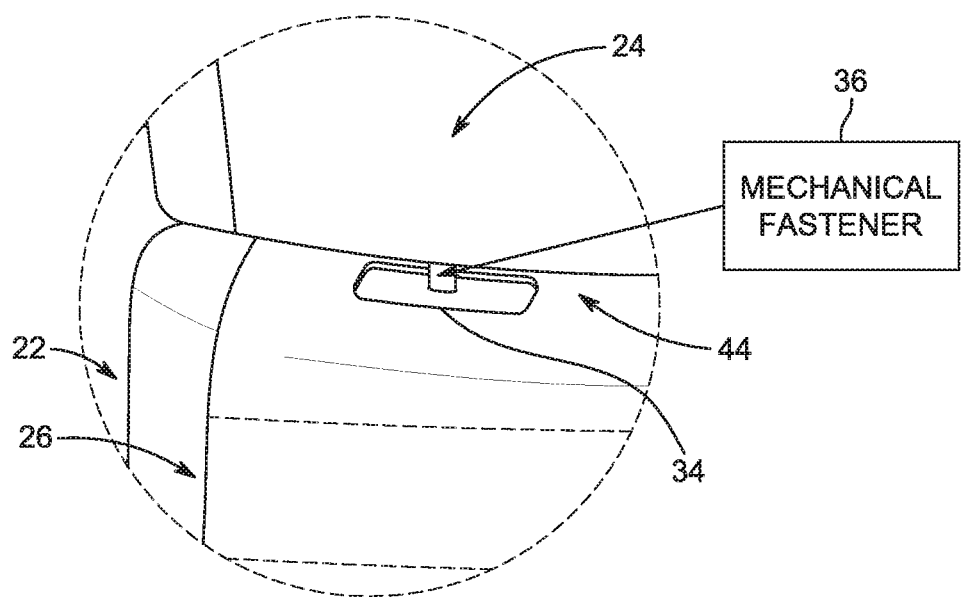

Before the trim cover 24 is positioned such that the trim attachment 42 is aligned with the apertures 34 and the pad attachment 40, the extension area 50 may be tucked into the attachment trench 44 as shown in FIGS. 8 and 9. This may bring the pad attachment 40 into better view through the apertures 34 to facilitate attachment of the mechanical faster 36 to the attachments 40, 42. In some embodiments, the mechanical fastener 36 may be arranged entirely within the aperture 34 once it is fully installed around the attachments 40, 42 as shown in FIG. 4. Alternatively, the extension area 50 may wrap around the pad attachment 40 in some embodiments such that the area immediately above the aperture 34 is captured against the pad attachment by the mechanical fastener 36. Because the extension area 50 is devoid of the heating element 30, if the mechanical fastener 36 unintentionally pierces the carrier sheet 28 during installation, the thermal functions of the heater mat 26 will not be disrupted.

The extension area 50 of the carrier sheet 28 that is devoid of the heating element 30 is an outermost end 46 of the heater mat 26 as shown in FIGS. 3 and 4. The outermost end 46 of the heater mat 26 is furthest from the seat bite line region 18 of the seat assembly 20 to maintain the heater mat 26 in a flat arrangement against outer surface 32 if the adhesive strip 381 fails. The adhesive strip 381 is positioned closer to the seat bite line region 18 of the seat assembly 20 than the aperture 34 so that the extension area 50 of the carrier sheet 28 can be maneuvered as the trim cover 24 is being installed on foam pad 22.

In some embodiments, the heater mat may become disengaged if the adhesive integrity at the top is compromised by moisture and other contaminants. In some embodiments, the heater mat is extended to capture the heater mat in the foam trench during installation. In one embodiment, 50 mm of additional material is added to the top of the heater mat and includes holes in the heater mat to not interfere with the trim attachment. Any suitable amount of additional material may be added depending on the size of the heater mat and the location of the attachments in the seat assembly. Adding a hog ring or any mechanical attachment in addition to the tape attachment may increase the robustness of the heater mat design.

In some embodiments, bottom and top tape (adhesive strips) are used to position & adhere the heater mat to the foam pad. With the heater mat adhered and positioned, the extended area of the heater mat may be tucked into the attachment trench. The trim cover attachment locations are aligned to the molded in pad attachment seen through the heater mat apertures. A mechanical attachment technique may be used (i.e. hog ring or any mechanical attachment) to attach the trim cover to the foam pad through the heater mat holes. This may restrict downward movement of the heater mat and prevent the heater mat from bunching up at the bottom of the seat back if the top heater mat adhesive strip fails.

The following numbered clauses include embodiments that are contemplated and non-limiting:

Clause 1. An occupant-support base comprises a seat assembly configured to support an occupant thereon.

Clause 2. The occupant-support base of clause 1, any other clause, or any suitable combination of clauses, wherein the seat assembly includes a seat frame, a foam pad coupled to the seat frame, and a trim cover coupled to the foam pad.

Clause 3. The occupant-support base of clause 2, any other clause, or any suitable combination of clauses, wherein the foam pad includes a pad attachment that extends through an attachment trench formed in the foam pad.

Clause 4. The occupant-support base of clause 3, any other clause, or any suitable combination of clauses, wherein the trim cover includes an outer sheet and a trim attachment coupled to the outer sheet and the pad attachment to mount the outer sheet to the foam pad.

Clause 5. The occupant-support base of clause 4, any other clause, or any suitable combination of clauses, further comprising a heater mat arranged between the outer sheet of the trim cover and the foam pad, the heater mat including a carrier sheet and a heating element coupled to the carrier sheet, the carrier sheet being formed to include an aperture.

Clause 6. The occupant-support base of clause 5, any other clause, or any suitable combination of clauses, further comprising a fastener system configured to couple the heater mat to the foam pad, the fastener system including an adhesive strip that couples the heater mat to at least one of the foam pad and the trim cover and a mechanical fastener that couples the trim attachment to the pad attachment to mount the trim cover to the foam pad and that passes through the aperture in the carrier sheet to retain the heater mat in position if the adhesive strip fails.

Clause 7. The occupant-support base of clause 6, any other clause, or any suitable combination of clauses, wherein the aperture in the carrier sheet provides a window so that the pad attachment is visible through the window when the trim cover is being installed.

Clause 8. The occupant-support base of clause 6, any other clause, or any suitable combination of clauses, wherein the fastener is a hog ring or any mechanical attachment and is configured to fasten the trim attachment to the pad attachment with the heater mat positioned between the trim attachment and the pad attachment such that the aperture is aligned with both the trim attachment and the pad attachment.

Clause 9. The occupant-support base of clause 6, any other clause, or any suitable combination of clauses, wherein the carrier sheet is devoid of the heating element in a portion of the carrier sheet and the aperture is formed in the portion of the carrier sheet that is devoid of the heating element.

Clause 10. The occupant-support base of clause 9, any other clause, or any suitable combination of clauses, wherein the portion of the carrier sheet that is devoid of the heating element is an outermost portion of the heater mat that is furthest from a seat bite line region of the seat assembly.

Clause 11. The occupant-support base of clause 10, any other clause, or any suitable combination of clauses, wherein the adhesive strip is positioned closer to the seat bite line region of the seat assembly than the aperture.

Clause 12. The occupant-support base of clause 6, any other clause, or any suitable combination of clauses, wherein the aperture is formed in an end of the carrier sheet that is positioned furthest from a seat bite line region of the seat assembly.

Clause 13. An occupant-support base comprising a seat assembly configured to support an occupant thereon, the seat assembly including a foam pad and a trim cover coupled to the foam pad, the foam pad and the trim cover each including, but not limited to, a listing attachment that, when fastened together, mounts the trim cover to the foam pad.

Clause 14. The occupant-support base of clause 13, any other clause, or any suitable combination of clauses, further comprising a heater mat coupled to the seat assembly and arranged between the trim cover and the foam pad, the heater mat including a carrier sheet and a heating element coupled to the carrier sheet, the carrier sheet being formed to include an aperture.

Clause 15. The occupant-support base of clause 14, any other clause, or any suitable combination of clauses, further comprising a mechanical fastener that ties the listing attachments in the foam pad and the trim cover together and extends through the aperture in the carrier sheet to couple the heater mat to the foam pad of the seat back.

Clause 16. The occupant-support base of clause 15, any other clause, or any suitable combination of clauses, wherein the aperture in the carrier sheet provides a window so that the listing attachment in the cushion is visible through the window when the trim cover is being installed on the foam pad.

Clause 17. The occupant-support base of clause 15, any other clause, or any suitable combination of clauses, wherein the carrier sheet is devoid of the heating element in a portion of the carrier sheet and the aperture is formed in the portion of the carrier sheet that is devoid of the heating element.

Clause 18. The occupant-support base of clause 17, any other clause, or any suitable combination of clauses, wherein the portion of the carrier sheet that is devoid of the heating element is an outermost portion of the heater mat that is furthest from a seat bite line region of the seat assembly.

Clause 19. The occupant-support base of clause 18, any other clause, or any suitable combination of clauses, further comprising an adhesive strip that secures the heater mat to the foam pad and that is positioned closer to the seat bite line region of the seat assembly than the aperture.

Clause 20. The occupant-support base of clause 15, any other clause, or any suitable combination of clauses, wherein the aperture is formed in an end of the carrier sheet that is positioned furthest from a seat bite line region of the seat assembly.

Clause 21. The occupant-support base of clause 15, any other clause, or any suitable combination of clauses, wherein the carrier sheet of the heater mat includes a heating area that carries the heating element and an extension area devoid of the heating element that is tucked within an attachment trench formed in the foam pad and the mechanical fastener retains the extension area to the listing attachment in the foam pad.

Clause 22. A method of assembling an occupant support, the method comprising providing a foam pad with at least one listing attachment coupled to the foam pad.

Clause 23. The occupant-support base of clause 22, any other clause, or any suitable combination of clauses, further comprising coupling a heater mat to an outer surface of the foam pad.

Clause 24. The occupant-support base of clause 23, any other clause, or any suitable combination of clauses, further comprising covering the foam pad and the heater pad with a trim cover to locate the heater mat between the foam pad and the trim cover.

Clause 25. The occupant-support base of clause 24, any other clause, or any suitable combination of clauses, wherein the trim cover and the heater mat are fastened to at least one listing attachment simultaneously during the step of covering.

Clause 26. The occupant-support base of clause 25, any other clause, or any suitable combination of clauses, wherein heater mat is formed to include an aperture that provides a window so that the listing attachment in the foam pad is visible through the window when the trim cover is being installed on the foam pad.

Clause 27. The occupant-support base of clause 25, any other clause, or any suitable combination of clauses, wherein the heater mat includes a carrier sheet and a heating element coupled to the carrier sheet, the carrier sheet being devoid of the heating element in a portion of the carrier sheet and the aperture being formed in the portion of the carrier sheet that is devoid of the heating element.

Clause 28. The occupant-support base of clause 27, any other clause, or any suitable combination of clauses, wherein the portion of the carrier sheet that is devoid of the heating element is an outermost portion of the heater mat that is furthest from a seat bite line region of the seat assembly.

Clause 29. The occupant-support base of clause 28, any other clause, or any suitable combination of clauses, further comprising an adhesive strip that secures the heater mat to the cushion and that is positioned closer to the seat bite line region of the seat assembly than the aperture.

Clause 30. The occupant-support base of clause 27, any other clause, or any suitable combination of clauses, wherein the carrier sheet of the heater mat includes a heating area that carries the heating element and an extension area devoid of the heating element that is tucked within an attachment trench formed in the foam pad and the mechanical fastener retains the extension area to the listing attachment in the foam pad.

The invention claimed is:

1. An occupant-support base comprising
   a seat assembly configured to support an occupant thereon, the seat assembly including a seat frame, a foam pad coupled to the seat frame, and a trim cover coupled to the foam pad, the foam pad including a pad attachment that extends through an attachment trench formed in the foam pad, the trim cover including an outer sheet and a trim attachment coupled to the outer sheet and the pad attachment to mount the outer sheet to the foam pad,
   a heater mat arranged between the outer sheet of the trim cover and the foam pad, the heater mat including a carrier sheet and a heating element coupled to the carrier sheet, the carrier sheet being formed to include an aperture, and
   a fastener system configured to couple the heater mat to the foam pad, the fastener system including an adhesive strip that couples the heater mat to at least one of the foam pad and the trim cover and a mechanical fastener that couples the trim attachment to the pad attachment to mount the trim cover to the foam pad and that passes through the aperture in the carrier sheet to retain the heater mat in position if the adhesive strip fails.

2. The occupant-support base of claim 1, wherein the aperture in the carrier sheet provides a window so that the pad attachment is visible through the window when the trim cover is being installed.

3. The occupant-support base of claim 2, wherein the fastener is a hog ring and is configured to fasten the trim attachment to the pad attachment with the heater mat positioned between the trim attachment and the pad attachment such that the aperture is aligned with both the trim attachment and the pad attachment.

4. The occupant-support base of claim 1, wherein the carrier sheet is devoid of the heating element in a portion of the carrier sheet and the aperture is formed in the portion of the carrier sheet that is devoid of the heating element.

5. The occupant support base of claim 3, wherein the portion of the carrier sheet that is devoid of the heating element is an outermost portion of the heater mat that is furthest from a seat bite line region of the seat assembly.

6. The occupant-support base of claim 5, wherein the adhesive strip is positioned closer to the seat bite line region of the seat assembly than the aperture.

7. The occupant-support base of claim 1, wherein the aperture is formed in an end of the carrier sheet that is positioned furthest from a seat bite line region of the seat assembly.

8. An occupant-support base comprising
a seat assembly configured to support an occupant thereon, the seat assembly including a foam pad and a trim cover coupled to the foam pad, the foam pad and the trim cover each including a listing attachment that, when fastened together, mounts the trim cover to the foam pad,
a heater mat coupled to the seat assembly and arranged between the trim cover and the foam pad, the heater mat including a carrier sheet and a heating element coupled to the carrier sheet, the carrier sheet being formed to include an aperture, and
a mechanical fastener that ties the listing attachments in the foam pad and the trim cover together and extends through the aperture in the carrier sheet to couple the heater mat to the foam pad of the seat back,
wherein the aperture is formed in an end of the carrier sheet that is positioned furthest from a seat bite line region of the seat assembly.

9. The occupant-support base of claim 8, wherein the aperture in the carrier sheet provides a window so that the listing attachment in the cushion is visible through the window when the trim cover is being installed on the foam pad.

10. The occupant-support base of claim 8, wherein the carrier sheet is devoid of the heating element in a portion of the carrier sheet and the aperture is formed in the portion of the carrier sheet that is devoid of the heating element.

11. The occupant support base of claim 10, wherein the portion of the carrier sheet that is devoid of the heating element is an outermost portion of the heater mat.

12. The occupant-support base of claim 11, further comprising an adhesive strip that secures the heater mat to the foam pad and that is positioned closer to the seat bite line region of the seat assembly than the aperture.

13. The occupant support of claim 8, wherein the carrier sheet of the heater mat includes a heating area that carries the heating element and an extension area devoid of the heating element that is tucked within an attachment trench formed in the foam pad and the mechanical fastener retains the extension area to the listing attachment in the foam pad.

14. A method of assembling an occupant support, the method comprising
providing a foam pad with at least one listing attachment coupled to the foam pad,
coupling a heater mat to an outer surface of the foam pad,
covering the foam pad and the heater pad with a trim cover to locate the heater mat between the foam pad and the trim cover,
wherein the trim cover and the heater mat are fastened to the at least one listing attachment simultaneously during the step of covering,
wherein the heater mat is formed to include an aperture that provides a window so that the listing attachment in the foam pad is visible through the window when the trim cover is being installed on the foam pad,
wherein the heater mat includes a carrier sheet and a heating element coupled to the carrier sheet, the carrier sheet being devoid of the heating element in a portion of the carrier sheet and the aperture being formed in the portion of the carrier sheet that is devoid of the heating element, and
wherein the portion of the carrier sheet that is devoid of the heating element is an outermost portion of the heater mat that is furthest from a seat bite line region of a seat assembly including a seat back and a seat bottom.

15. The occupant-support base of claim 14, further comprising an adhesive strip that secures the heater mat to the cushion and that is positioned closer to the seat bite line region of the seat assembly than the aperture.

16. The occupant-support base of claim 14, wherein the carrier sheet of the heater mat includes a heating area that carries the heating element and an extension area devoid of the heating element that is tucked within an attachment trench formed in the foam pad and the mechanical fastener retains the extension area to the listing attachment in the foam pad.

* * * * *